United States Patent Office 3,367,961
Patented Feb. 6, 1968

3,367,961
PREPARATION OF ESTERS BY CARBONYLATING ESTERS OF ALLYL ALCOHOLS IN THE PRESENCE OF GROUP VIII NOBLE METAL CATALYSTS
James L. Brewbaker, Farmington, Mich., assignor to Ethyl Corporation, New York, N.Y., a corporation of Virginia
No Drawing. Filed Aug. 31, 1964, Ser. No. 393,395
18 Claims. (Cl. 260—486)

ABSTRACT OF THE DISCLOSURE

A catalytic process is described for preparing an ester of an unsaturated acid and an alcohol having up to 18 carbon atoms. The process comprises reacting an alcohol of this type with carbon monoxide and an allyl ester of up to 30 carbon atoms:

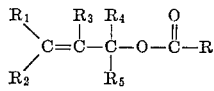

R is a $C_{1-18}$ hydrocarbyl radical and $R_1$, $R_2$, $R_3$, $R_4$ and $R_5$ are hydrogen or univalent $C_1$–$C_{13}$ hydrocarbyl groups. The process is carried out in the presence of a catalytic amount of palladium metal, rhodium metal, or chelates and inorganic salts of said metals. Palladium on charcoal is an example of a useful catalyst; ethylvinyl acetate is an especially useful product.

The process is described as a batch process as well as a continuous process.

---

This invention relates to a novel process for the preparation of esters. More specifically, it relates to a process for the preparation of esters of unsaturated carboxylic acids. More particularly, it relates to a catalytic process for the preparation of esters which comprises a carbon monoxide insertion reaction.

An object of this invention is to provide a process for the preparation of esters. Another object is to provide a method for the preparation of esters derived from unsaturated carboxylic acids. A further object is to provide a novel carbon monoxide insertion reaction. Additional objects will be apparent from the following detailed description and appended claims.

The objects of this invention are satisfied by the provision of a process which comprises the reaction of an alcohol and carbon monoxide with an ester of an allylic alcohol in the presence of a noble metal catalyst. A preferred embodiment of this invention comprises a process for the preparation of an ester of an alcohol having one to about 18 carbon atoms and an unsaturated carboxylic acid, said carboxylic acid having at least four carbon atoms such that one of said carbon atoms is within the carboxy group of said ester and the remaining three of said carbon atoms are within a n-propenyl radical which is bonded to said carboxy group; said process comprising reacting said alcohol and carbon monoxide with a reactant ester having the formula:

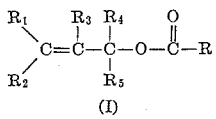
(I)

wherein R is a hydrocarbyl radical having from one to about 18 carbon atoms and $R_1$, $R_2$, $R_3$, $R_4$, and $R_5$ are independently selected from the class consisting of hydrogen and univalent hydrocarbyl radicals having up to about 13 carbon atoms such that the total number of carbon atoms within said reactant ester does not exceed about 30; said process being carried out in the presence of a catalyst selected from the class consisting of palladium metal, rhodium metal, and chelates and inorganic salts of said metals.

A highly preferred embodiment comprises a process for the preparation of ethyl vinylacetate from ethanol, carbon monoxide, and allyl acetate in the presence of a catalyst selected from the class consisting of palladium metal, rhodium metal, and inorganic salts and chelates of said metals.

The process of this invention is characterized by its decided economical advantages and its simplicity. The reactants are inexpensive and readily obtainable. Furthermore, the catalysts employed are stable and relatively non-toxic; hence, they can be stored and used without elaborate safety precautions. Moreover, the process is readily carried out in standard reaction vessels.

An important aspect of this invention is that it requires considerably less than a molar equivalent quantity of catalyst. Moreover, the catalytic activity is not destroyed by the process; therefore, the catalysts are reusable. The catalysts are solids and can be dispersed on an inert matrix. Thus, the process can be carried out as a continuous flow operation.

The process of this invention comprises the insertion of carbon monoxide into an ester of an allyl alcohol and the subsequent reaction of the butenoic acid moiety thereby produced with an alcohol reactant to form an ester. One molecule of carbon monoxide is inserted into each allyl group reacted. A by-product ester formed from the alcohol reactant and the carboxylic acid from which the allyl ester reactant is derived can also be produced in this process. Thus, the reaction of allyl valerate with carbon monoxide and ethanol can be represented by the following equation wherein [cat.] represents a catalytic amount of a material selected from the class consisting of palladium, rhodium, palladium chelates, rhodium chelates, palladium salts, and rhodium salts.

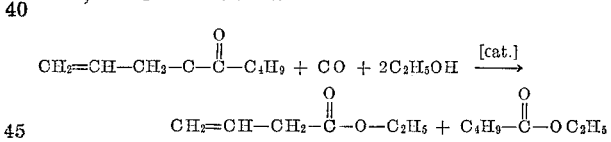

As discussed below, migration of the double bond may occur to yield (in addition to the esters illustrated by the equation) ethyl crotonate.

Although the process can be carried out by contacting the ester of the allyl alcohol (the reactant ester) with carbon monoxide in a 1:1 mole ratio, it is not necessary to do so. Frequently it is desirable to employ an excess of either reactant. For example, an excess of allyl ester can be employed as a solvent and/or dispersing medium. The amount of excess is not critical and is governed to some extent by the cost of the ester, the solubility of carbon monoxide therein, equipment design, and ease of separation of the desired products. Thus, up to 30 or 40 or more moles of allylic ester per mole of carbon monoxide can be employed, if desired.

An excess of carbon monoxide frequently increases the yield. Consequently, it is frequently desirable to employ from about 1.5 to about 25 or more moles of carbon monoxide per each mole of allylic ester group to be reacted. A preferred excess is from about 2 to about 15 moles, and a most preferred ratio from about 3 to about 12 moles of carbon monoxide per each mole of allylic ester group. Thus, if the allylic ester contains one allyl ester radical, a preferred ratio is from about 3 to about 15 moles of carbon monoxide per mole of allylic ester. Similarly, if the allylic ester contains two allyl ester radicals, a preferred range is from about 6 to about 30 moles of carbon monoxide per each mole of allylic ester.

The process can be carried out in the presence of inert ingredients. For example, it can be carried out in the presence of a reaction medium which does not enter into the reaction. Preferably, the reaction medium is an inert organic liquid such as a hydrocarbon or mixture thereof. Hydrocarbons which can be employed can be either aliphatic, alicyclic or aromatic. Typical applicable hydrocarbon media are cyclohexane, benzene, toluene, isooctane, No. 9 oil, kerosene, petroleum ether, and the like.

Compounds which contain active hydrogens, other than the alcohol employed as a reactant, interfere with the preparation of esters by this process. Therefore, the total concentration of non-alcoholic compounds which contain an active hydrogen should not exceed about 0.1 percent by weight. Preferably, the concentration of non-alcoholic compounds containing active hydrogens should be less than about 0.05 percent, and most preferably, below 0.001 percent. In other words, this process is preferably carried out in the substantial absence of compounds other than the reactant alcohol which have an active hydrogen.

A temperature which affords a reasonable reaction time and which does not cause an excessive decomposition of the products or reactants is preferred. In many instances, best results are obtained when a temperature within the range of from about 85° C. to about 300° C. is employed. A preferred temperature range is from about 90° C. to about 190° C. and a highly preferred range is from about 100° C. to about 150° C. To some extent, the reaction temperature influences the type of product obtained. Thus, in many instances, if an ester of an allylic alcohol is reacted at a comparatively low temperature, that is, from about 85° C. to about 150° C., the predominant product is an ester of a vinylacetic acid. If the reaction is carried out at a temperature from about 150° C. to about 300° C., the product in many instances is predominantly an ester of a crotonic acid. In most instances (and especially at temperatures within the range of from about 100 to about 170° C.) the product is a mixture of the corresponding esters of a vinylacetic acid and the ester of a crotonic acid. Thus, the process of this invention can afford (A) an ester having the formula:

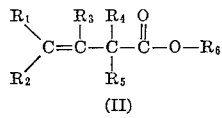

(II)

wherein $R_1$–$R_5$ are univalent hydrocarbyl radicals or hydrogen and $R_6$ is a univalent hydrocarbyl radical; (B) an ester having the formula:

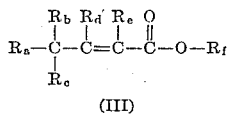

(III)

wherein $R_a$–$R_e$ are univalent hydrocarbyl radicals or hydrogen and $R_f$ is an equivalent hydrocarbyl radical; or (C) a mixture of (A) and (B). Esters of formula (A) are esters of a vinylacetic acid and esters of formula (B) are derived from a crotonic acid. The migration of the double bond to form an ester of a crotonic acid is usually enhanced by longer reaction times.

The pressure at which the process of this invention is carried out is not critical. A readily obtainable pressure which affords a reasonable yield of product in a comparatively short reaction time is preferred. Although this process may be carried out at atmospheric or superatmospheric pressures, in many instances best results are obtained when the reaction is carried out at superatmospheric pressures within the range of from about 50 p.s.i. to about 10,000 p.s.i. A preferred pressure range is from about 500 p.s.i. to about 7,000 p.s.i. and a highly preferred range is from about 1,000 p.s.i. to 4,500 p.s.i.

The reaction time is not a truly independent variable and is dependent to some extent on the nature of the allylic esters reacted and the other process variables under which the reaction is conducted. For example, when high temperatures and high pressures are employed, the reaction time is usually reduced. Similarly, low temperatures and low pressures usually require a long reaction time. In most instances, the reaction is complete within from about one-quarter to about 48 hours. If temperatures of above about 150° C. are employed, and a vinylacetic ester is desired, it is frequently desirable to employ a reaction time of less than about three hours.

When the reaction is carried out in the presence of a liquid phase, agitation of the reaction mixture is efficaciously employed. Although not essential, efficient agitation usually affords a smooth reaction rate and tends to decrease the reaction time. For best results, when the process is carried out in the vapor phase, the catalyst (preferably in a fine state of subdivision) is dispersed on an inert matrix.

The catalyst employed in the process of this invention can be palladium, rhodium, or a chelate or a salt of these metals. It is preferred that the catalyst be in a fine state of subdivision. Metal turnings and finely divided metal powders can be employed. Colloidal dispersions of palladium and rhodium in an inert solvent are also applicable. Similarly, the metals can be dispersed and supported on an inert solid matrix such as charcoal, alumina, diatomaceous earth, bentonite, firebrick, kaolin, ground glass, silicon carbide, and the like. Mixtures or alloys of the metals in any of the forms described above can be employed, if desired.

Any salt of palladium or rhodium, having an anion which is non-reactive under the reaction conditions employed and which does not unduly retard the formation of the acid halide product by an extraneous side reaction, is a suitable catalyst. Applicable catalytic salts include inorganic and organic salts. Salts of fatty acids having up to about four carbon atoms are preferred organic salts. Highly preferred salts of this type are palladium and rhodium acetate. Inorganic salts and especially simple inorganic salts constitute a highly preferred class of catalytic salts. Salts of this type are readily available and comparatively inexpensive. Illustrative but non-limiting examples of simple inorganic salts which can be employed are the palladium and rhodium halides such as palladium (II) chloride, palladium (II) bromide, rhodium (III) chloride, rhodium (III) bromide, and the like.

A wide variety of palladium and rhodium chelates are applicable in the instant process. Preferred chelates have a donor atom selected from the class consisting of Group V-A and Group VI-A elements. More preferred chelating agents have a donor atom selected from the class consisting of nitrogen and oxygen. Triamines, tetraamines, and oximes comprise a preferred class of chelating agents having nitrogen as a donor atom. Dibasic carboxylic acids comprise a preferred class of chelating agents having oxygen as a donor atom. Thus, chelates derived from well-known chelating agents such as salicylic acid, α-acyloin oxime, α-benzoin oxime, dimethylglyoxime, acetylacetone, aminoacetic acid, oxalic acid, diethylenetriamine, triethylenetetraamine, malonic acid, and the like can be employed. Illustrative but non-limiting examples of applicable chelates include $$K_2Pd^{II}(C_2O_4) \cdot 2H_2O,$$

$Na_3[Rh(C_2O_4)_3] \cdot 6H_2O$, $K_3[Rh(malonato)_3] \cdot 5H_2O$, tris (ethylenediamine) rhodium$^{III}$, palladium (II) dimethylglyoximate, and the like. Hydrated chelates illustrated above are usually employed in such amount that the water of hydration does not exceed about 0.1% by weight of the total reaction mixture.

The palladium catalysts described and illustrated above are, in general, more reactive than those of rhodium and, therefore, are preferred. More preferably, the catalyst is selected from the class consisting of palladium metal and simple inorganic palladium salts. Highly preferred catalysts are palladuim, palladium chloride, and palladium bromide. The most preferred catalyst is palladium chloride.

The reaction is carried out in the presence of a catalytic amount of one or more of the above catalysts which is usually up to about 20 mole percent. Amounts as low as 0.001 mole percent can be employed, but usually amounts in the range of 0.01 to 5 mole percent are used.

A wide variety of allyl esters can react according to the process of this invention. Thus, any allyl ester which (1) is stable under the reaction conditions employed, (2) contains a free allylic ester radical,

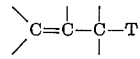

(T=carboxyl), as a reactive group, and (3) does not contain substituent groups which hinder or retard the process of this invention by undergoing competitive side reactions, are applicable. A free allylic ester radical is not in such juxtaposition with other radicals or groups that it is incapable of reacting as an allylic group because of a perturbation of its electronic structure by the neighboring radicals or groups.

Preferred allylic esters which meet the above criteria have the formula

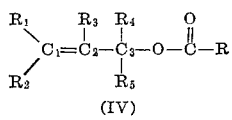

wherein $R_1$, $R_2$, $R_3$, $R_4$, and $R_5$ are independently selected from the class consisting of hydrogen and univalent organic radicals selected from the class consisting of alkyl, cycloalkyl, aralkyl, aryl, alkaryl, alkenyl, and cycloalkenyl radicals having up to about 13 carbon atoms such that the total number of carbon atoms in said reactant ester does not exceed about 30; and R is a stable organic radical preferably selected from the class consisting of alkyl, cycloalkyl, aralkyl, aryl, and alkaryl radicals.

Allylic esters having up to about 30 carbon atoms are preferred since, in general, they are more readily available. However, it is clear that no exact critical limitation of the number of carbon atoms exists. Consequently, allylic halides having more than 30 carbon atoms, say 40 or more, can be employed in the process.

To some extent, the position of substitution on the allylic carbon atoms influences the type of butenoic acid ester obtained. Specifically, the position of substitution will determine if the carboxy radical in the butenoic acid ester product is bonded to carbon atoms $C_1$, $C_2$ or $C_3$ in Formula IV. In practice, mixture of $C_1$- and $C_3$-carboxy products are frequently obtained. Most of these products have a predominant amount of one product or the other. Most often, the predominant product has the carboxy radical bonded to at least substituted of carbon atoms $C_1$ and $C_3$.

Thus, for example, if 1-methylallyl acetate ($R_1$, $R_2$, $R_3$ and $R_5$ are hydrogen) is reacted with carbon monoxide and ethanol according to this process at a comparatively low temperature and for a comparatively short reaction time to minimize the migration of the double bond, the predominant product is:

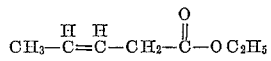

The identical product predominates when 3-methyl allyl chloride ($R_2$, $R_3$, $R_4$ and $R_5$ equal hydrogen) is reacted under similar conditions.

When 2-methylallyl acetate is reacted under similar conditions, the product is:

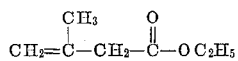

This product is obtained if carbon atom $C_1$ or $C_3$ in the starting material is substituted with the ester radical. Hence, the radical $R_3$ in Formula IV usually does not have any directive properties. Thus, 1,2-dimethylallyl acetate and 2,3-di-methylallyl acetate yield the same product when reacted under identical reaction conditions.

The preferred allylic esters are formed from allyl alcohols which do not have a substituent on carbon $C_1$ and another on carbon $C_2$ in Formula IV.

Two allylic esters, wherein $R_1$ and $R_2$ in one of them are identical to $R_4$ and $R_5$ in the other, yield the same predominant product. Thus, 1,1-dimethylallyl benzoate and 3,3-dimethylallyl benzoate can be reacted to yield the identical predominant product. If an allylic ester has the same number of organic radicals bonded to carbon atom $C_1$ as are bonded to carbon atom $C_3$, but the substituents are not identical, the predominant product usually will have the ester radical bonded to the carbon atom which is the least sterically hindered. Thus, if 1-phenyl-3-methylallyl benzoate is reacted with propanol and carbon monoxide according to this process under conditions in which the migration of the double bond is minimized, the predominant product is

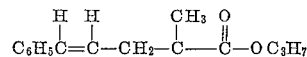

This illustrates that the directive influences of groups such as the phenyl (or tert-butyl or cyclohexyl radical) is much greater than a methyl radical (or a primary alkyl radical). The directive influence of different primary alkyl radicals (and different secondary alkyl radicals) is approximately the same. Thus, for example, an allylic ester of Formula IV wherein $R_1$ is n-butyl and $R_4$ is ethyl ($R_2$ and $R_5$ being identical), in most instances, yields an approximately equimolar mixture of esters having the ester radical bonded to carbon atom $C_1$ in one of them and carbon atom $C_3$ in the other.

Applicable alkyl substituted allylic esters having Formula I are illustrated by 1-methylallyl acetate ($R_4$ is a methyl radical), 1,1-dimethylallyl propionate, 2-methylallyl butyrate ($R_3$ is a methyl radical), 1,2-dimethylallyl octanoate, 1,1,2-trimethylallylallyl octadecenoate, 3-methylallylacetate ($R_1$ is a methyl radical), 3,3-dimethylallyl laurate, 1,2,3-trimethylallyl undecanoate, 2,3-dimethylallyl 2-methyloctanoate, 2,3,3-trimethylallyl caproate, 1,1,2,3,3-pentamethylallyl isobutyrate and the like.

Allylic esters which are substituted with other alkyl radicals also from the corresponding esters when reacted according to the process of this invention. Typical allylic esters which may be employed in this process are 1-ethylallyl acetate, 2-propylallyl cyclohexanoate, 3-tert-butylallyl 3-isopropylcyclohexanoate, 3,3-dipentylallyl benzoate, 2-ethyl-1-methylallyl 2-methylbenzoate, 1,1-dihexylallyl 4-isoamylbenzoate, 1,2,3-triheptylallyl 4-heptylbenzoate, 3,3-diisopropylallyl propionate, 3,3-diamyl-1-methylallyl 4-heptylcyclohexanoate, 1,1,2,3,3-pentaethylallyl butyrate, 1-propyl-2-ethyl-3,3-dihexylallyl p-toluate, 3-tridecylallyl caproate, 2-dodecylallyl acetate, 1-dodecyl-3,3-dipropylallyl dodecanoate, 3-dodecyl-2-pentylallyl benzoate, and the like. The above compounds illustrate that the substituents within the applicable allyl esters may have either a straight or branched chain.

Allylic esters that are substituted with cycloalkyl radicals are applicable. For example, when one mole of 3-cyclohexylallyl acetate and ethanol is reacted with carbon monoxide at 150° C. under a pressure of 500 p.s.i. in the presence of a catalytic amount of two percent palladium on charcoal, the product is a mixture comprising ethyl 3-cyclohexylvinylacetate and ethyl 3-cyclohexylcrotonate. In a similar manner, 2-cyclohexylallyl acetate, 1-cyclohexylallyl acetate, 1,1-dicyclohexylallyl formate, 1,2,3 - tricyclohexylallyl propionate, 3 - cyclopentylallyl butyrate, 2-cyclopentylallyl caproate, and the like, react according to this process to yield the corresponding esters.

The allyl esters employed in this process may be substituted with an aralkyl radical. As an example, 2-phenylethylallyl acetate reacts at 140° C. with propanol and carbon monoxide at a pressure of 1,000 p.s.i. and in the presence of a catalytic amount of palladium powder to yield a mixture of ethyl 2-[2-phenyl]ethylvinylacetate and ethyl 2-[2-phenyl]ethylcrotonate. In a similar manner, 2-benzylallyl formate, 3,3-dibenzylallyl isobutyrate, 1,3-di-2-[phenyl]ethylallyl heptonate, 1,2,3-tri-[3-phenyl] butylallyl octadecanoate react according to this process to yield the corresponding esters.

Allylic esters containing unsaturated aliphatic radicals can be employed in this process. Preferred compounds of this type do not contain conjugated double bonds. Illustrative but non-limiting examples of this type of reactant include 3-but-3-enylallyl acetate, 2-[2-methyl]-but-3-enylallyl benzoate, and the like. Similar alkenyl radicals having up to about 13 carbon atoms can also be employed in this process.

Aryl substituted allyl esters can also be employed. As an example, 3-phenylallyl benzoate reacts with methanol and carbon monoxide at a pressure of 5,000 p.s.i. in hexane and in the presence of a catalytic amount of 10 percent rhodium on bentonite at 120° C. to yield methyl 3-phenylvinylacetate and methyl 3-phenylcrotonate. In a similar manner, 1-phenylallyl formate, 1,1-diphenylallyl acetate, 2-phenylallyl benzoate, 3,3-diphenylallyl toluate, 1,2,3-triphenylallyl cyclohexanoate, and the like, react to yield the corresponding esters.

Alkaryl substituted allylic esters are applicable in the process of this invention. Thus, 3-o-tolylallyl acetate reacts at 160° C. with ethanol and carbon monoxide at a pressure of 5,000 p.s.i. in the presence of hexane (as a liquid reaction medium) and a catalytic amount of palladium chloride to yield ethyl 3-o-tolyl vinylacetate and ethyl 3-o-tolylcrotonate. Likewise, 3[1,3,5-tri-tert-butyl]-phenylallyl benzoate, 2[1,3,5-tri-tert-butyl]phenylallyl 4-isobutyl benzoate, 1[1,3,5-tri-tert-butyl]phenylallyl formate, 1[2-heptyl]phenylallyl cyclohexanoate, 3,3 - di[3-ethyl]phenylallyl 2-naphthenoate, 3,3-di[3-butyl]phenylallyl 3-naphthenoate, and the like, react to yield the corresponding esters.

Other allylic esters can also be employed in this process. For example, the allylic group may be partially or totally within a cyclic system. For example, the compounds

 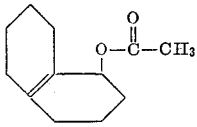

(V)                 (VI)

yield the corresponding esters when reacted according to the process of this invention.

The hydrocarbon radicals bonded to the allylic group in the above compounds can be substituted with non-hydrocarbon radicals provided that the non-hydrocarbon substituents are stable under the reaction conditions employed and do not enter into competitive side reactions. Hence, the radicals $R_1$, $R_2$, $R_3$, $R_4$ and $R_5$ in Formula IV can be substituted with radicals selected from the class consisting of fluoro, chloro, bromo, cyano, diethylamino, carbonyl, carboalkoxy, aldehydo, alkoxy, aryloxy, N,N-diethylamido, and the like. Preferably, the non-hydrocarbon substituents are bonded to a carbon atom which is not adjacent to a carbon atom within the allyl group.

The variety of allylic esters applicable in this process demonstrates that the process of this invention is substantially a reaction involving the allylic group,

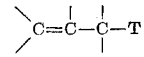

wherein T is carboxy), and the radicals bonded to the allyl group are not involved except in some instances to direct the position of substitution. Primarily because of their greater availability, allylic esters of Formula IV, having up to 30 carbon atoms, are preferred.

Any alcohol having a reactive hydroxyl group is applicable in this process; it is preferred that the alcohol have up to about 18 carbon atoms. Highly preferred alcohols are selected from the class consisting of compounds having the formula R—OH where R is an alkyl, cycloalkyl, aralkyl, aryl, or alkaryl radical. Typical alcohols having an alkyl radical bonded to the hydroxy group include methyl alcohol, ethyl alcohol, isopropyl alcohol, sec-butyl alcohol, tert-butyl alcohol, capryl alcohol, n-decyl alcohol, lauryl alcohol, myristyl alcohol, stearyl alcohol, and the like. Alcohols which have a cycloalkyl radical bonded to the hydroxy group (and which are applicable in this process) include cyclohexanol, cyclopentanol, cycloheptanol, cyclooctanol, 2-methyl cyclohexanol, 4-octyl cyclohexanol, and the like. Applicable aryl alcohols which can be employed in this process include phenol, 2-naphthanol, 1-naphthanol, and the like. Alkaryl alcohols which are applicable include o-cresol, m-cresol, p-cresol, 4-isobutylphenol, p-cyclohexylphenol, and the like. Similarly, o-hydroxydiphenyl and p-hydroxyphenyl can also be employed. Alcohols having an alkaryl radical bonded to the hydroxy group include benzyl alcohol, 2-phenylethanol, 2-phenylpropanol, and the like. Methanol and ethanol are the most preferred alcohols.

Polyhydric alcohols such as ethyleneglycol, dihydroxyacetone, glycerol, pentaerythritol, catechol, resorcinol, hydroquinone, pyrogallol, and the like can be employed.

Preferably, the alcohol reactant is employed in excess. In a preferred embodiment, from 2 to about 30 moles of alcohol are employed per each mole of ester reactant. In a more preferred embodiment, at least 10 moles of alcohol per each mole of ester are employed. An excess of alcohol, though not critical, tends to increase the rate of reaction and form a higher yield of product. The amount of excess is not critical and is governed to some extent by the cost of the alcohol, the solubility of other reactants therein, equipment design, and ease of separation of the desired products.

In many instances, especially when an excess of alcohol is employed and the alcohol is a liquid at the reaction temperature, the excess acts as a reaction medium. If the alcohol is a gas or a solid at the reaction temperature, one or more reaction media which are liquid at the reaction temperature can be employed to provide a liquid phase. A liquid phase is not critical to the process, however; for example, this process can be carried out by contacting vapors of the alcohol and ester reactant and carbon monoxide with a solid catalyst.

The products of this case are either solids or liquids at room temperature and can be separated from the reaction mixture by any method known in the art. Thus, the products can be isolated by distillation, extraction, fractional crystallization, salting out, chromatography, and other similar methods.

The following non-limiting examples further illustrate the process of the invention but do not limit it. In the examples, all parts are by weight unless otherwise noted.

*Example 1*

Palladium chloride, 2 parts, 6 parts of 5 percent palladium on charcoal, 150 parts of allyl acetate, and about 400 parts of absolute ethanol were sealed in a suitable two-liter autoclave. The autoclave was flushed with carbon monoxide and then pressured (at 16° C.) to 2,000 p.s.i.g. The reaction mixture was then stirred at 125° C. and 150° C. for 3.7 and 1.0 hours respectively. The vessel was then cooled and vented.

The contents of the vessel were discharged into a suitable vessel. The autoclave was rinsed with ethanol and the ethanol washings added to the discharged contents. The combined mixture was then filtered and the clear filtrate distilled through a distillation column packed with glass helices. Following the distillation of the alcohol, 53.3 parts of ethyl vinylacetate was collected (B.P. 122–3.5°, $n_D^{20}$=1.4099).

A small amount of the isolated ethyl vinylacetate was saponified by boiling it in a solution of 10 parts of sodium hydroxide in 100 parts of a mixture of methanol and water. Thereafter, the resultant mixture was acidified and upon extraction, trans-crotonic acid was obtained. The trans-crotonic acid resulted from a migration of the double bond and did not depress the melting point of an authentic sample of trans-crotonic acid when admixed therewith.

*Example 2*

The process of Example 1 is repeated except that the 6 parts of 5 percent palladium on charcoal are omitted. Similar results are obtained. When Example 1 is repeated except that the two parts of palladium chloride is omitted, similar results are obtained.

*Example 3*

The process of Example 1 is repeated except that 6 parts of the following catalysts, one at a time, are substituted for the mixture of palladium chloride and palladium on charcoal employed in Example 1: 5 percent rhodium on charcoal, 10 percent rhodium on alumina, 5 percent rhodium on diatomaceous earth, 10 percent rhodium on bentonite, 3 percent rhodium on firebrick, 7 percent rhodium on kaolin, 6 percent rhodium on silicon carbide, 5 percent palladium on charcoal, 10 percent palladium on alumina, 5 percent palladium on diatomaceous earth, 10 percent palladium on bentonite, 3 percent palladium on firebrick, 7 percent palladium on kaolin, and 6 percent palladium on silicon carbide.

*Examples 4 to 25*

The reactions listed in the following table further illustrate the process of this invention. They are all carried out by reacting one mole of the allylic ester with from 10 to 50 moles of the alcohol in the presence of 0.1 percent by weight of the catalyst. The by-product ester produced from the alcohol reactant and the carboxylic acid from which the allylic ester is derived, is produced in each of the reactions indicated. However, for simplicity, it is not mentioned by name.

Similar results are obtained when 0.01 to 5 percent by weight of catalyst are employed. Furthermore, similar results are obtained when from 2 to 100 moles of alcohol are employed per each mole of allylic ester. In addition to the reactants listed, Examples 9, 12, 19, and 23 are carried out in the presence of benzene, 3 moles. Similar results are obtained when kerosene or ligroin are employed.

Substitution of $K_2Pd^{II}(C_2O_4) \cdot 2H_2O$ $Na_3 Rh(C_2O_4)_3] \cdot 6H_2O$, $K_3[Rh(malonato)_3] \cdot 5H_2O$ tris(ethylenediamine) rhodium$^{III}$, palladium (II) dimethylglyoximate, and the like, for the catalysts listed in the following table yields similar results.

| Ex. | Allylic Ester | Alcohol | Catalyst | Carbon Monoxide Pressure | Temperature (deg.) | Time (hr.) | Product(s) |
|---|---|---|---|---|---|---|---|
| 4 | Allyl acetate | 2-octanol | PdCl₂ | 4,000 | 130 | 1 | 2-octyl 3-butenoate, 2-octyl 2-butenoate. |
| 5 | Allyl formate | Methanol | PdBr₂ | 2,000 | 80 | 12 | Methyl 3-butenoate, methyl 2-butenoate. |
| 6 | Allyl benzoate | Phenol | 5% pd on charcoal. | 1,800 | 125 | 3 | Phenyl 3-butenoate, phenyl 2-butenoate. |
| 7 | Allyl toluate | Isopropanol | 7% pd on charcoal. | 4,000 | 200 | ½ | Iso-propyl 3-butenoate, iso-propyl 2-butenoate. |
| 8 | Allyl cyclohexanoate. | Cyclohexanol | 8% pd on charcoal. | 5,000 | 160 | 2 | Cyclohexyl 3-butenoate, cyclohexyl 2-butenoate. |
| 9 | Allyl stearate | n-Hexanol | 10% pd on charcoal. | 2,000 | 125 | 2 | n-Hexyl 3-butenoate, n-hexyl 2-butenoate. |
| 10 | Allyl myristate | n-Heptanol | 20% pd on charcoal. | 2,000 | 125 | 2 | n-Heptyl 3-butenoate, n-heptyl 2-butenoate |
| 11 | 3-cyclohexylallyl propionate. | n-Propanol | RhCl₃ | 500 | 150 | 10 | n-Propyl 4-cyclohexyl-3-butenoate, n-propyl 4-cyclohexyl-2-butenoate. |
| 12 | 1,1-dicyclohexylallyl benzoate. | o-Cresol | RhBr₃ | 7,000 | 165 | 8 | o-Tolyl 4,4-dicyclohexyl-3-butenoate, o-tolyl 4,4-dicyclohexyl-2-butenoate. |
| 13 | 2-benzylallyl butyrate. | Phenol | 5% rhodium on charcoal. | 1,000 | 85 | 1 | Phenyl 3-benzyl-3-butenoate, phenyl 3-benzyl-2-butenoate. |
| 14 | 3-but-3-enylallyl acetate. | Sec-butanol | Rhodium metal and rhodium trichloride. | 1,000 | 115 | 2 | Sec-butyl 3,7-octadienotate, sec-butyl 2,7-octadienoate. |
| 15 | 1-methylallyl acetate. | Methanol | PdCl₂ | 700 | 125 | 3 | Methyl 3-pentenoate, methyl 2-pentenoate. |
| 16 | 3,3-di-methyl-allyl acetate. | n-Pentanol | PdBr₂ | 1,800 | 160 | 2 | n-Pentyl 4-methyl-3-pentenoate, n-pentyl 4-methyl-2-pentenoate. |
| 17 | 2-propylallyl acetate. | Iso-butanol | 5% pd on firebrick. | 4,500 | 145 | 2 | Iso-butyl 3-propyl-3-butenoate, iso-butyl 3-propyl-2-butenoate. |
| 18 | 2-ethyl-1-methyl-allyl acetate. | n-Octanol | Pd metal | 3,000 | 150 | 7 | n-Octyl 3-ethyl-3-pentenoate, n-octyl 3-ethyl-2-pentenoate. |
| 19 | 3-dodecylallyl acetate. | 2-octanol | Rhodium metal powder. | 4,500 | 135 | 2 | 2-octyl 3-hexadecenoate, 2-octyl 2-hexadecenoate. |
| 20 | 1-phenylallyl benzoate. | Ethanol | PdCl₂ | 1,000 | 125 | 2 | Ethyl 4-phenyl-3-butenoate, ethyl 4-phenyl-2-butenoate. |
| 21 | 1,2-diphenyl allyl acetate. | Tert-butanol | PdBr₂ | 500 | 150 | 6 | Tert-butyl-3,4-diphenyl-3-butenoate, tert-butyl-3,4-diphenyl-2-butenoate. |
| 22 | 1,1-diphenyl allyl propionate. | Allyl alcohol | RhCl₃ | 25,000 | 135 | 10 | Allyl 3-butenoate, allyl 2-butenoate. |
| 23 | 3,3-diphenyl allyl acetate. | o-Cresol | RhBr₃ | 6,000 | 175 | 3 | o-Tolyl 4,4-diphenyl-3-butenoate, o-tolyl 4,4-diphenyl-2-butenoate. |
| 24 | 1-o-tolylallyl acetate. | p-Cresol | PdCl₂ | 7,000 | 300 | ¼ | p-Tolyl 4-(o-tolyl)-3-butenoate, p-tolyl 4-(o-tolyl)-2-butenoate. |
| 25 | 2,3,3-tributyl allyl acetate. | Lauryl alcohol | RhCl₃ | 3,000 | 110 | 4 | n-Dodecyl 3,4-dibutyl-3-octenoate, n-dodecyl 3,4-dibutyl-2-octenoate. |

*Example 26*

A glass-lined stainless steel reaction tube, approximately 50 cm. in length, is packed with silicon carbide beads having 7% by weight of palladium chloride dispersed thereon. A thermal couple is placed in the packing and attached to temperature indicating means outside of the reaction tube. The tube is connected to heating means.

An inlet tube is fitted to the reaction tube. The inlet tube is connected to a source of allyl acetate vapor, a source of carbon monoxide, and a source of ethanol vapor. The inlet tube is fitted with pressure indicating means downstream from the carbon monoxide and vapor sources.

The downstream end of the reaction tube is fitted with discharge means connected to a heat exchanger. The heat exchanger is connected to a receiving vessel. The receiving vessel is fitted with venting means to release unreacted gases and vapors. The vessel is also fitted with a product outlet.

Means for heating the vaporous ethanol and allyl acetate and a flow-metering device are located between the allyl acetate and ethanol sources and the inlet tube. The source of carbon monoxide comprises a container of carbon monoxide under pressure, fitted with outlet means, means for heating the stream of carbon monoxide, a pressure regulating valve, and a flow-metering device.

The reaction tube is heated to 300° C. The flow of allyl acetate vapors, ethanol vapors, and carbon monoxide is initiated and the vapors and carbon monoxide gas are heated to 300° C. The relative amounts of carbon monoxide and allyl acetate and ethanol vapors are regulated so that an approximately equivalent amount of these materials are introduced into the reaction tube.

During the passage of the reactant materials through the reaction zone, a mixture of ethyl vinylacetate and ethyl crotonate is formed. This mixture and the unreacted gases leave the reaction tube and enter the heat-exchange vessel whereby the product is liquified. The liquified product and the unreacted gases then pass to the receiving vessel. The unreacted gases are vented from the receiving vessel and, at intervals, the liquid product is removed therefrom.

Many of the esters produced by the process of this invention are well-known compounds. They have the many utilities which are known for those compounds. All of the ilustrated carboxylic acid esters produced by this process are valuable chemical intermediates. For example, they can be hydrolyzed to prepare the corresponding acids. Furthermore, they can be transesterified to form other esters. In addition, the olefinic bonds may be reduced with hydrogen to produce the esters of the corresponding saturated acids. Similarly, the olefinic bonds can be brominated or chlorinated by addition of bromine or chlorine. Similarly, they can be hydrobrominated by the addition of hydrogen bromide.

Having fully described the novel process of this invention, the products produced thereby, and their many utilities, it is desired that this invention be limited only within the lawful scope of the appended claims.

I claim:

1. A catalytic process for the preparation of an ester of an alcohol having one to about 18 carbon atoms and an unsaturated carboxylic acid, said carboxylic acid having at least four carbon atoms such that one of said carbon atoms is within the carboxy group of said ester and the remaining three of said carbon atoms are within a n-propenyl radical which is bonded to said carboxy group; said process comprising reacting said alcohol and carbon monoxide with a reactant ester having the formula:

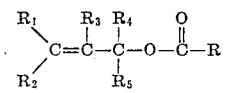

wherein R is a hydrocarbyl radical having from one to about 18 carbon atoms selected from the class consisting of alkyl, cycloalkyl, aralkyl, aryl, alkaryl, alkenyl and cycloalkenyl radicals and $R_1$, $R_2$, $R_3$, $R_4$ and $R_5$ are independently selected from the class consisting of hydrogen and univalent hydrocarbyl alkyl, cycloalkyl, aralkyl, aryl, alkaryl, alkenyl and cycloalkenyl radicals having up to about 13 carbon atoms such that the total number of carbon atoms within said reactant ester does not exceed about 30; said process being carried out in the presence of a catalyst selected from the class consisting of palladium metal, rhodium metal, and chelates and inorganic salts of said metals said process being carried out at a temperature of from about 85° C. to about 300° C. at a pressure of from about 15 to 10,000 p.s.i.

2. A catalytic process for the preparation of an ester of an alcohol having one to about 18 carbon atoms and a butenoic acid, said process comprising reacting said alcohol and carbon monoxide with a reactant ester having the formula:

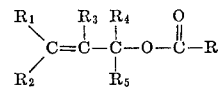

wherein R is a hydrocarbyl radical having one to about 13 carbon atoms selected from the class consisting of alkyl, cycloalkyl, aralkyl, aryl, and alkaryl radicals, and $R_1$, $R_2$, $R_3$, $R_4$ and $R_5$ are independently selected from the class consisting of hydrogen and univalent organic radicals selected from the class consisting of alkyl, cycloalkyl, aralkyl, aryl, alkaryl, alkenyl and cycloalkenyl radicals having up to about 13 carbon atoms such that the total number of carbon atoms in said reactant ester does not exceed about 30; said process being carried out under superatmospheric pressure up to about 10,000 p.s.i., at temperatures of from about 85° C. to about 300° C. and in the presence of a catalytic quantity of a catalyst selected from the class consisting of palladium metal, rhodium metal, and chelates and inorganic salts of said metals.

3. The process of claim 2 wherein R is an ethyl radical.

4. The process of claim 2 wherein R is a propyl radical.

5. The process of claim 2 wherein R is a phenyl radical.

6. The process of claim 2 wherein R is a methyl radical.

7. The process of claim 2 wherein said reactant ester is allyl acetate.

8. The process of claim 7 wherein said catalyst is palladium chloride.

9. The process of claim 2 wherein the catalyst is palladium supported on an inert matrix.

10. The process of claim 2 wherein said catalyst is a mixture of palladium chloride and palladium on charcoal.

11. The process of claim 2 being carried out in the presence of a liquid phase.

12. The process of claim 2 being carried out in the substantial absence of compounds other than said alcohol which have an active hydrogen.

13. The process of claim 12 wherein said temperature is within the range of from about 100 to about 120° C.

14. The process of claim 12 wherein said pressure is within the range of 50 to about 10,000 p.s.i.

15. The process of claim 12 wherein an excess of said alcohol is employed.

16. The process of claim 15 wherein said alcohol is ethanol.

17. Process for the preparation of ethyl vinylacetate, said process comprising reacting ethanol and carbon monoxide under a pressure of from about 2,000 to about 6,000 p.s.i. with allyl acetate in the presence of a catalytic quantity of a catalyst comprising a mixture of palladium dihalide and palladium metal supported on an inert matrix; at a temperature within the range of 100 to 130° C.

18. The process of claim 17 wherein said catalyst is a mixture of palladium chloride and palladium on charcoal.

References Cited

UNITED STATES PATENTS 3,040,090   6/1962   Alderson et al. ___ 260—486 XR
3,309,403   3/1967   Mador et al. _____ 260—544

(Other references on following page)

FOREIGN PATENTS 1,138,760  10/1962  Germany.

OTHER REFERENCES

Chiusoli et al.: (I), Zeitchrift Fur Naturfoschung, vol. 17B (1962), page 850.

Chiusoli et al.: (II), Chim. Ind. (Milan), vol. 45 (1963) pages 6–9.

Fischer et al.: Zeitschrift Fur Naturfoschung, vol. 17B (1962), pp. 484–5.

Heck: J. Am. Chem. Soc., vol. 85 (1963), pp. 2013–14.

Tsuji et al.: (III), Tetrahedron Letters (1963), pp. 1811–13.

Tsuji et al.: Part VIII, J. Am. Chem. Soc., vol. 86 (October 1964), pp. 4350–4353.

LORRAINE A. WEINBERGER, *Primary Examiner.*

A. P. HALLUIN, *Assistant Examiner.*

Notice of Adverse Decision In Interference

In Interference No. 96,929 involving Patent No. 3,367,961, J. L. Brewbaker, PREPARATION OF ESTERS BY CARBONYLATING ESTERS OF ALLYL ALCOHOLS IN THE PRESENCE OF GROUP VIII NOBLE METAL CATALYSTS, final judgment adverse to the patentee was rendered Apr. 28, 1972, as to claims 1, 2, 3, 4, 5, 6, 7, 8, 9, 10, 11, 12, 13, 14, 15 and 16.

[*Official Gazette December 12, 1972.*]